Patented Oct. 16, 1951

2,571,345

UNITED STATES PATENT OFFICE 2,571,345

RUBBER DERIVATIVES

James D. D'Ianni, Akron, Ohio, assignor to Wingfoot Corporation, Akron, Ohio, a corporation of Delaware No Drawing. Application November 19, 1946, Serial No. 710,954

8 Claims. (Cl. 260—768)

This invention relates to rubber derivatives, to methods for their preparation and to the use thereof. More particularly, it relates to materials prepared by reacting rubber with a urea in the presence of a condensation catalyst.

One object of the invention is to produce rubber derivatives which are useful for a wide variety of purposes. Another object of the invention is to provide methods for preparing these rubber derivatives. Another object of the invention is to provide a method for employing these rubber derivatives as adhesives and particularly to provide a method for securing the adhesion of rubber to cellulose, cellulose derivatives and other materials with the production of laminated products having outstanding physical characteristics. Other objects and advantages will appear as the description proceeds.

According to the invention, a mixture of rubber and a urea is treated with a condensation catalyst to produce rubber derivatives which may be used for molding, coating and other purposes and are particularly useful as adhesives. The practice of the invention is illustrated by the following examples and description.

Example 1

Five hundred grams of dead milled rubber and 100 grams of urea were thoroughly mixed in a small dough mixer and then 25 ml. of a 40% solution of boron fluoride in ether was added dropwise over a period of 2–3 minutes. The mixture was then heated to 60–70° C. for 2 hours with continued mixing, the mass becoming homogeneous and quite plastic. The product, which weighed 614 grams, was washed with water on a washing mill and dried. Six grams of phenyl-beta-naphthylamine were then milled into the product for the purpose of retarding oxidation. The final product weighed 606 grams and was a sticky, brown, apparently homogeneous mass. It was still somewhat rubber-like and was easily sheeted out on a rubber mill.

Example 2

A mixture of 500 grams of dead milled rubber and 100 grams of thiourea was placed in a small dough mixer and masticated until homogeneous, after which 25 ml. of a 40% solution of boron fluoride in ether was added over 2–3 minutes, and the resultant mixture was heated and masticated at 60–70° C. for 2 hours. The product, which weighed 610 grams, was quite similar to the product of Example 1. One percent of phenyl-beta-naphthylamine based on the weight of the product was then milled into the product.

While urea and thiourea are preferred materials, various other ureas may also be employed in the invention, the broad class being typified by the structural formula

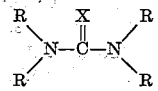

in which X is selected from the group consisting of oxygen, sulfur and selenium and in which at least one R is hydrogen and the remaining R's are selected from the group consisting of alkyl, aryl, alicyclic and aralkyl radicals.

Further examples of ureas which may be used are sym. dimethyl urea, monomethyl urea, monoethyl urea, N-methyl-N'-ethyl urea, sym. diethyl urea, unsym. diethyl urea, triethyl urea, allyl urea, diallyl urea, phenyl urea, N-phenyl-N'-tolyl urea, N-ethyl-N'-phenyl urea, sym. diphenyl urea, unsym. diphenyl urea, triphenyl urea, benzyl urea, sym. dibenzyl urea, unsym. dibenzyl urea, tribenzyl urea, phenethyl urea, N-phenyl-N'-methyl-N'-phenyl urea, N-phenyl-N'-ethyl-N'-phenyl urea, N-methyl-N-phenyl urea, N-ethyl-N-tolyl urea, cyclohexyl urea, sym. dicyclohexyl urea, N-methyl-N',N'-pentamethylene urea, N,N'-hexamethylene urea, N-methyl-N'-decahydronaphthyl urea, N-phenyl-N'-benzyl urea, N-methyl-N'-dibenzyl urea, N-cyclohexyl-N'-benzyl urea, N-cyclohexyl-N'-diethyl urea, N-naphthyl-N'-dicyclohexyl urea, N-benzyl-N'-phenetidyl urea and corresponding thio and seleno ureas.

Although boron fluoride is a preferred catalyst, other condensation catalysts may also be employed to promote the formation of the rubber derivatives. The condensation catalyst apparently produces some condensation or cyclization of the rubber molecules. In addition, the rubber reacts with the urea to produce a complex product involving addition to or condensation with the added material. Thus, in general, any condensation catalyst which will cause condensation or cyclization of the rubber molecules may be used. The halides of the amphoteric metals are a preferred class. Further examples are sulfuric acid, phenol sulfonic acid, toluene sulfonic acid, various chlorsulfonic acids, aluminum chloride, ferric chloride, chromic chloride and others well known in the art.

The conditions of the reaction in preparing the rubber derivatives will vary with the choice of catalyst and starting materials. For example, boron fluoride causes a relatively rapid reaction while a mixture of zinc chloride and glacial acetic acid is slower. In general, the temperature will be in the range from 15 to 125° C. The time of reaction may be as short as 15 minutes or as long as 3 or 4 hours. The urea may be used in widely varying proportions, 20–50% based on the rubber having been found to be satisfactory, quantities from 10–35% actually being retained by the rubber.

The rubber derivatives described are useful for many purposes but they are particularly advantageous in the preparation of adhesives and are eminently suitable for use in laminating rubber to cellulosic products, the latter type of lamination often giving considerable difficulty, especially when the cellulose is in regenerated form, as in rayon or cellophane. In using the derivatives in the lamination of rubber to cellulose, it is sometimes, though not always, desirable to employ them in conjunction with an organic diisocyanate, this procedure being especially advantageous when the cellulose is in regenerated form. Various diisocyanates, either aromatic or aliphatic, may be used. Illustrative examples are para-phenylene diisocyanate, meta-phenylene diisocyanate, the diphenylene diisocyanates, methylene di(p-phenylene isocyanate), ethylene di(oxy trimethylene isocyanate), and the diisocyanates of dipropyl ethers. Methylene di(p-phenylene isocyanates) gives outstanding results, may be prepared from readily available materials and constitutes a preferred example. If desired, the cellulose may be treated with the diisocyanate and thereafter treated with the rubber derivative and then laminated to rubber or, if desired, the diisocyanate may be added to the solution of the rubber derivative and the cellulose coated with the mixture. From the practical standpoint, the latter procedure is preferred and it has been found that particularly good results are obtained if a cement containing the rubber derivative and the diisocyanate is prepared and allowed to stand before use, for example, for about 24–48 hours.

When a rayon cord was dipped into a 10% benzol solution of hexamethylene diisocyanate and dried and then dipped into a 5% benzol solution of the product of Example 1 and dried and then cured into rubber, the rubber-to-rayon adhesion was 18.6 pounds as compared with 4–5 pounds for untreated cord. Rayon cord similarly treated with a 10% benzol solution of hexamethylene diisocyanate and a 10% benzol solution of the product of Example 2 gave an adhesion of 17.3 pounds.

The use of the adhesive compositions has been particularly described in connection with the lamination of regenerated cellulose to rubber since this is an especially difficult problem which emphasizes the merit of the invention but the adhesives are also excellent for securing natural cellulose, such as cotton cord, to rubber and for securing rubber to cellulose derivatives and to glass fibers and for other purposes.

This application is a continuation-in-part of my copending application Serial No. 407,604 filed August 20, 1941, and now abandoned.

I claim:
1. As a new composition of matter, the product obtained by reacting 100 parts of rubber with 20–50 parts of urea at a temperature between about 15° C. and 125° C. and in the presence of a condensation catalyst for rubber.

2. As a new composition of matter, the product obtained by reacting 100 parts of rubber with 20–50 parts of thiourea at a temperature between about 15° C. and 125° C. and in the presence of a condensation catalyst for rubber.

3. As a new composition of matter, the product obtained by reacting 100 parts of rubber with 20–50 parts of urea at a temperature between about 15° C. and 125° C. and in the presence of a catalytic quantity of boron fluoride.

4. As a new composition of matter, the product obtained by reacting 100 parts of rubber with 20–50 parts of thiourea at a temperature between about 15° C. and 125° C. and in the presence of a catalytic quantity of boron fluoride.

5. As a new composition of matter, the product obtained by reacting 100 parts of rubber with 20–50 parts of urea at a temperature of about 60 to 70° C. in the presence of boron fluoride.

6. As a new composition of matter, the product obtained by reacting 100 parts of rubber with 20–50 parts of thiourea at a temperature of about 60 to 70° C. in the presence of boron fluoride.

7. As a new composition of matter, the product obtained by reacting, in the presence of a condensation catalyst for rubber and at a temperature between about 15° C. and 125° C., 100 parts of rubber and 20–50 parts of a compound having the structural formula

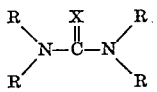

in which X is selected from the group consisting of oxygen, sulfur and selenium and at least one R is hydrogen and the remaining R's are selected from the group consisting of hydrogen, alkyl, aryl, alicyclic and aralkyl radicals.

8. A process which comprises reacting in the presence of a condensation catalyst for rubber and at a temperature between about 15° C. and 125° C., 100 parts of rubber and 20–50 parts of a compound having the structural formula

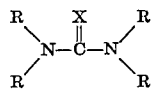

in which X is selected from the group consisting of oxygen, sulfur and selenium and at least one R is hydrogen and the remaining R's are selected from the group consisting of hydrogen, alkyl, aryl, alicyclic and aralkyl radicals.

JAMES D. D'IANNI.

REFERENCES CITED

The following references are of record in the file of this patent:

UNITED STATES PATENTS

| Number | Name | Date |
| --- | --- | --- |
| 1,503,429 | Russell | July 29, 1924 |
| 1,503,430 | Russell | July 29, 1924 |
| 1,981,722 | Ditmar | Nov. 20, 1934 |
| 2,018,643 | Williams | Oct. 22, 1935 |
| 2,018,644 | Williams | Oct. 22, 1935 |
| 2,227,777 | Farmer et al. | Jan. 7, 1941 |
| 2,311,656 | Griffith | Feb. 23, 1943 |

FOREIGN PATENTS

| Number | Country | Date |
| --- | --- | --- |
| 333,290 | Great Britain | Aug. 11, 1930 |